Figure 1:
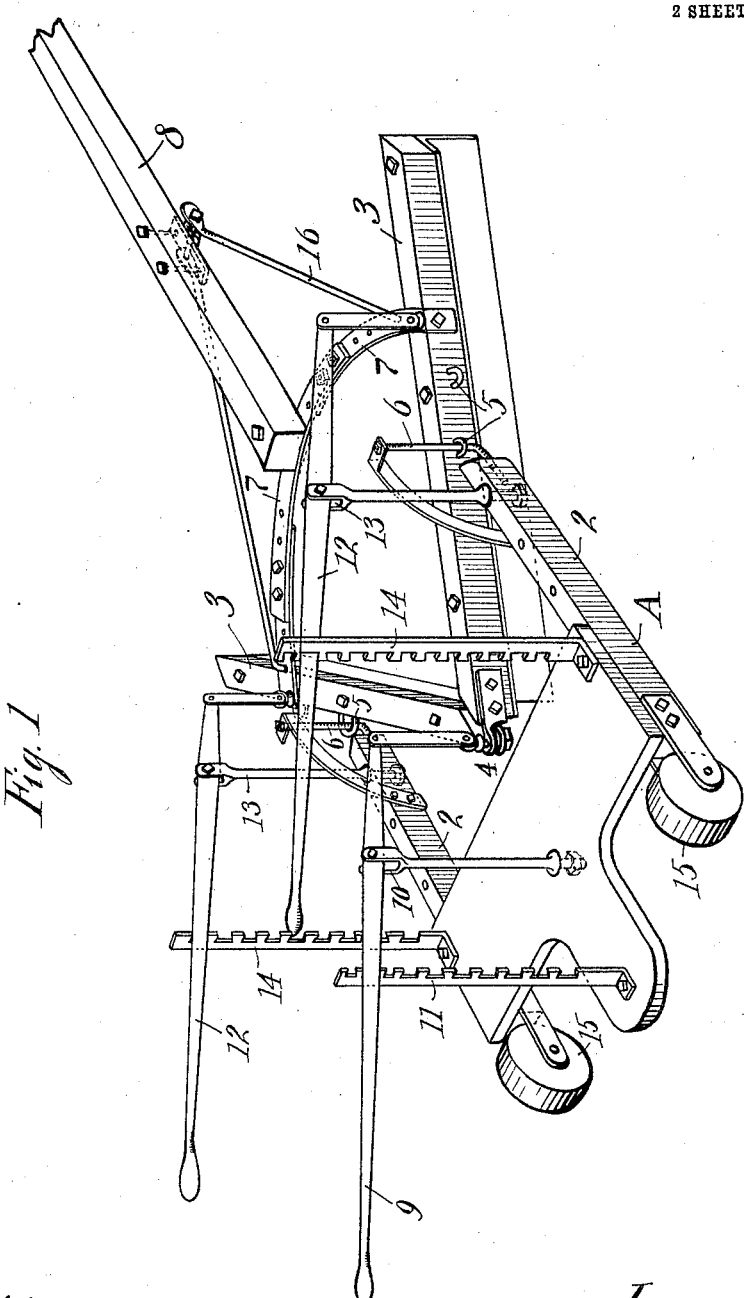

W. STOOPS.
ROAD DRAG.
APPLICATION FILED OCT. 10, 1910.

1,038,456.

Patented Sept. 10, 1912.
2 SHEETS—SHEET 1.

Witnesses,
George Voelker

Inventor,
William Stoops
by Lothrop & Johnson
his Attorneys.

W. STOOPS.
ROAD DRAG.
APPLICATION FILED OCT. 10, 1910.
1,038,456.
Patented Sept. 10, 1912.
2 SHEETS—SHEET 2.
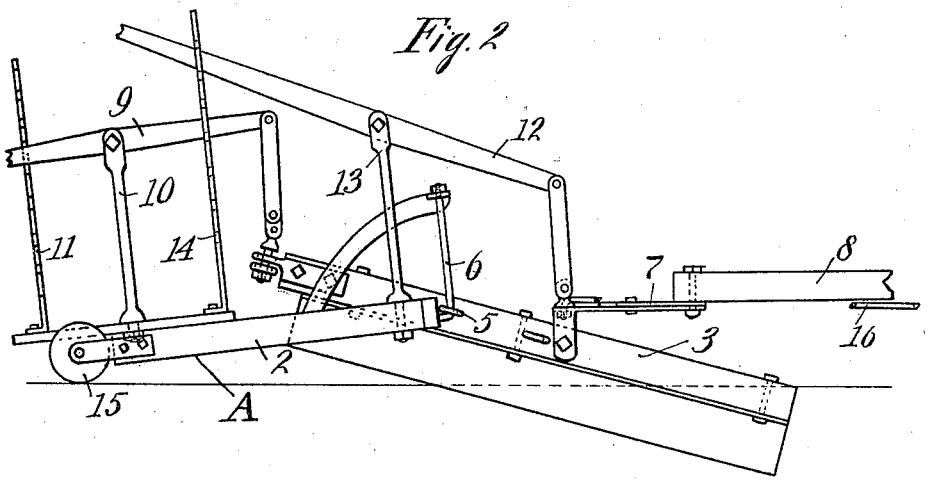
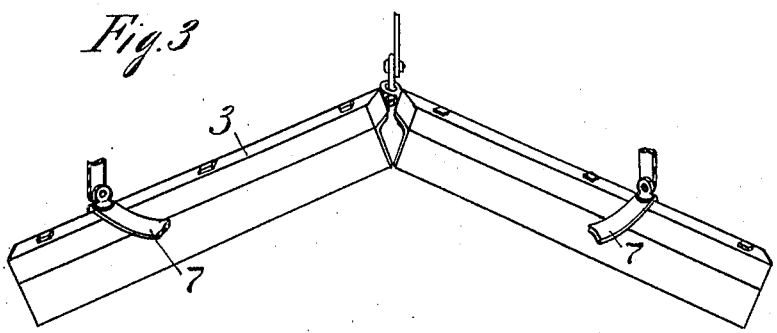
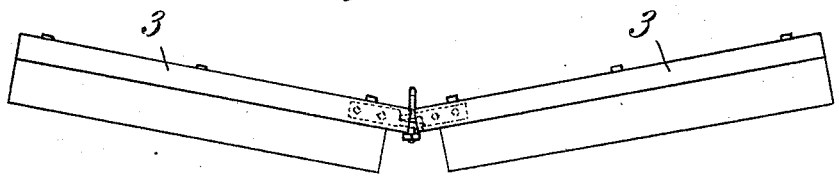
Witnesses,
George Voelker
J. Smith
Inventor;
William Stoops
by Lothrop & Johnson
his Attorneys.

UNITED STATES PATENT OFFICE.

WILLIAM STOOPS, OF EAU GALLE, WISCONSIN.

ROAD-DRAG.

1,038,456.  Specification of Letters Patent.  Patented Sept. 10, 1912.

Application filed October 10, 1910. Serial No. 586,222.

*To all whom it may concern:*

Be it known that I, WILLIAM STOOPS, a citizen of the United States, residing at Eau Galle, in the county of Dunn and State of Wisconsin, have invented certain new and useful Improvements in Road-Drags, of which the following is a specification.

My invention relates to improvements in road drags, its object being particularly to provide a road drag with greater amount of adjustment and adaptability than the ordinary construction.

To this end my invention consists in the features of construction, combination, and arrangement of parts hereinafter described and claimed.

In the accompanying drawings forming part of this specification Figure 1 is a perspective view of my improved drag; Fig. 2 is a side elevation of the same; and Figs. 3 and 4 are detail views of the drag bars.

Referring to the drawings A represents the drag frame including a pair of forwardly extending parallel bars 2 between the free ends of which are arranged the drag bars 3 having pivotal connection 4. The drag bars 3 are formed with eyes 5 receiving vertical rods 6 upon the ends of the bars 2. A plurality of the eyes 5 are provided so that the bars may be set in different spread positions. The drag bars are connected by adjustable bands 7 centrally supporting a pole 8. A lever 9 has fulcrum support 10 upon the frame A and supports at its forward end the pivotally connected ends of the drag bars, said lever working in connection with a toothed bar 11 at its rear end. Similar levers 12 have fulcrum support 13 on the forward ends of the side bars 2 and are connected at their forward ends with the free ends of the drag bars 3, said levers working at their free ends in connection with vertical toothed bars 14. The frame is provided with suitable wheels 15. Brace arms 16 preferably connect the pole 8 with the bands 7.

In use the lever 9 is actuated to raise the pivotally connected ends of the drag bars to vary the rounding of the road and either of the levers 12 may be used to raise the corresponding supported drag bar to cause a higher rounding of that side of the road. In raising either of the drag bars by its lever 12 the bar will slide upon the corresponding rod 6. The flare of the drag bars may be varied by adjusting the straps 7 and using the required ones of the eyes 5 to support the drag bars from the rods 6.

I thus provide a road drag which is adaptable to all the varying conditions of road work.

In use where the drag bars are raised from the ground the frame bars 2 will drag upon the ground. Where the drag bars dig into the ground as shown in Fig. 2 the forward ends of the bars 2 will be relatively lifted from the ground as indicated in Fig. 2.

I claim as my invention:

1. A road drag comprising a frame supported to drag at one end upon the ground, a pair of diverging pivotally connected drag bars carried by the drag end of said frame, and means for independently and vertically adjusting said bars with relation to said frame whereby said bars may be lifted from the ground with said frame dragging upon the ground or the drag end of said frame lifted above the ground with said drag bars in contact with the ground.

2. A road drag comprising a frame arranged to drag at one end upon the ground, a pair of diverging pivotally connected drag bars supported by the drag end of said frame, means for vertically adjusting the pivoted ends of said bars and for adjusting the bars with relation to said frame to cause the pivoted ends of said bars and the supporting end of said frame to stand above the ground with the diverging ends of the drag bars upon the ground and independent means for raising the drag bars from the ground with the frame resting upon the ground.

3. A road drag comprising a frame having forwardly extending bars, a pair of diverging drag bars pivotally connected at their inner ends, means adjustably connecting the free ends of said bars, means for adjustably supporting said drag bars upon the ends of said frame bars, means for independently and vertically adjusting said bars with reference to said frame, and means for vertically adjusting the inner ends of said bars.

In testimony whereof I affix my signature in presence of two witnesses.

WILLIAM STOOPS.

Witnesses:
H. S. JOHNSON,
H. SMITH.

Copies of this patent may be obtained for five cents each, by addressing the "Commissioner of Patents, Washington, D. C."